Patented June 8, 1948

2,443,063

UNITED STATES PATENT OFFICE 2,443,063

METHOD FOR THE PURIFICATION OF STEARIC ACID

David E. Adelson, Berkeley, Calif., assignor to Shell Development Company, San Francisco, Calif., a corporation of Delaware No Drawing. Application February 9, 1944, Serial No. 521,734

10 Claims. (Cl. 260—419)

This invention relates to a method for the purification of stearic acid. It relates particularly to a method for separating stearic acid in a pure state from commercial grades of stearic acid which contain as impurities other fatty acids, especially palmitic acid and oleic acid, which method comprises recrystallizing the said impure stearic acid from a ketone solvent.

Stearic acid is a compound of considerable commercial importance. As commercially obtained it contains considerable quantities of other fatty acids such as oleic acid and palmitic acid. A typical commercial grade stearic acid may contain, for example, about 90% of stearic acid together with about 6% of palmitic acid and about 4% of oleic acid. For many of its commercial applications stearic acid must be in a comparatively pure state. For example, when it is used as a starting material for the synthesis of alpha-bromo stearic acid, which is widely used as an intermediate in the preparation of lubricating oil addition agents such as alpha-mercapto stearic acid, thio-alpha, alpha'-bis stearic disulfide and N-orthotoluidine alpha-stearic acid, the stearic acid should be at least 96% pure and preferably more than 99% pure in order to obtain a satisfactory product.

Numerous methods have been proposed in the past for purifying crude stearic acid. The most commonly used has been fractional distillation at subatmospheric pressure. This method does not, however, result in a satisfactory separation of the stearic acid from the other fatty acids present in the mixture. Another method comprises forming the methyl esters of the fatty acids which are present in commercial grade stearic acid, fractionally distilling the resulting mixture of methyl esters in order to separate the methyl stearate therefrom, and then hydrolyzing the said methyl stearate. While this results in the formation of fairly pure stearic acid the method has the disadvantage of involving three separate steps with consequent losses of product and low recoveries of stearic acid. It has also been proposed to purify technical grade stearic acid by recrystallizing it from solvents comprising a mixture of water and a water-miscible organic compound such as methyl alcohol, ethyl alcohol, isopropyl alcohol, acetone, etc. This method has several disadvantages. In the first place when alcohols, e. g. methyl alcohol or ethyl alcohol, are constituents of the solvent mixture, esterification of the stearic acid by the said alcohol takes place to a sufficient degree to materially reduce the recoveries of stearic acid obtained from the solvent mixture. The use of methyl alcohol as a solvent is attended by the disadvantage that it is a toxic substance which requires special precautions during handling. It is undesirable to use appreciable amounts of water in the solvent mixture, since to do so may reduce the solubility of all of the fatty acids present in the crude stearic acid mixture to a point where the selective nature of the solvent is materially decreased and the oleic and palmitic acids may be precipitated together with the stearic acid, thus resulting in the separation of an impure product. The presence of water in the solvent mixture also produces a "creeping" effect caused by selective evaporation of the more volatile solvent from the solvent mixture. This results in the formation of a film or scum which comprises stearic acid together with relatively high percentages of other fatty acids. Since it is difficult or even impossible to remove this film before separation of the crystallized stearic acid, there is resultant contamination of the latter and a relatively impure product results. The solvents mentioned, e. g. methyl alcohol, ethyl alcohol, isopropyl alcohol, acetone, etc. are also characterized by relatively low boiling points and high volatility. Their use is therefore disadvantageous in that they possess high evaporation rates, which results in appreciable losses of solvent during the crystallization process. Also, since their boiling points are low, the effective temperature range over which the crystallization process may be carried out is relatively small.

It has now been found that very pure stearic acid, i. e. stearic acid which is at least 99% pure, may be prepared from commercial grades of stearic acid containing appreciable amounts of other fatty acids, e. g. palmitic acid and oleic acid by the simple process of crystallizing the said impure stearic acid from a ketone solvent. More specifically stated, technical grade stearic acid may be effectively purified by forming at an elevated temperature a solution of the said impure stearic acid in a solvent comprising a saturated or unsaturated non-aromatic ketone having from 4 to 9 carbon atoms, lowering the temperature of the solution of the said impure stearic acid and the said ketone solvent to a temperature at which crystallization of pure stearic acid takes place, and separating the crystallized stearic acid from the mother liquor.

Ketone solvents which may be used in executing the process of the invention comprise, in general, as stated hereinabove, saturated and unsaturated non-aromatic ketones having from 4 to 9 carbon atoms. Representative ketones which may be used are methyl ethyl ketone, methyl propyl ketone, methyl isopropyl ketone, methyl-n-butyl ketone, methyl isobutyl ketone, di-ethyl ketone, ethyl-n-propyl ketone, ethyl isopropyl ketone, ethyl butyl ketone, ethyl amyl ketone, propyl butyl ketone, mesityl oxide and isophorone. Certain of the alicyclic ketones may also be used as solvents, for example, cyclopentanone, the methyl cyclopentanones, the ethyl cyclopentanones, cyclohexanone, the methyl cyclohexanones and the like. These may be used singly or in admixture with each other. Preferred ketones are methyl ethyl ketone and the methyl butyl ketones. While it is preferred to use unsubstituted ketones, the purification process may also be effected using ketones which contain non-interfering substituent groups such as a halogen atom, an ether group, etc. Diketones and unsaturated aliphatic or alicyclic ketones may also be used. Although it is preferred to use the ketone solvents in a substantially anhydrous condition, very small amounts of water, i. e. amounts of the order of 1% or less, may not materially affect the efficiency of the process.

Thus, in a preferred method of operation an impure commercial grade of stearic acid, e. g. one containing about 86% stearic acid, about 4% oleic acid and about 10% palmitic acid, may be dissolved in a sufficient amount of substantially anhydrous methyl ethyl ketone to form a solution containing between about 15% and about 25% by weight of the crude stearic acid. The solution may be effected at a temperature of above 42° C. but below the boiling temperature of the solvent. Stirring, shaking or other means of agitation may be employed to accelerate the solution process. After the crude stearic acid is completely dissolved, the temperature of the solution may be lowered to a temperature at which crystallization of pure stearic acid takes place, i. e. at a temperature of above about 15° C. but below about 40° C., preferably between about 15° C. and about 25° C. The agitation or stirring of the solution may be continued during the cooling step to cause the separation of the pure stearic acid in the form of very fine crystals which are of better color and a higher degree of purity than if the crystallization were allowed to take place without such stirring or agitation. After crystallization of the stearic acid is complete, the product may be separated from the mother liquor by any suitable means. If desired, it may be further purified by one or more subsequent recrystallizations from the same solvent.

The crystallization process may be carried out in any suitable type of apparatus. As stated, it is preferred to use apparatus equipped with means for stirring or agitating the solution in order to effect rapid solution of the crude stearic acid in the solvent and also to insure the formation of a pure product of good color. This may be accomplished, for example, by stirring, by shaking or by passing a current of an inert gas, e. g. air, through the solution. It is desirable to carry out the process in equipment which is insulated to make possible careful control of the temperature of the solution and to prevent too rapid cooling thereof. The apparatus used should also be provided with means for heating the mixture of stearic acid and ketone solvent and with means for carefully regulating the temperature of the solution.

The temperature at which the crude stearic acid is dissolved in the ketone solvent is variable depending upon the particular solvent employed, but may, in general, be between the minimum temperature required to effect complete solution of the stearic acid and the boiling point of the solvent. In the case of methyl ethyl ketone, the solution temperature will therefore be between about 42° C. and about 80° C., a preferred range being between about 50° C. and about 70° C.

The temperature to which the solution of crude stearic acid in ketone solvent is cooled to effect the separation of pure stearic acid is likewise variable depending upon the solvent employed but may, in general, be below the temperature at which incipient crystallization of stearic acid takes place but above the temperature of incipient crystallization of oleic acid, palmitic acid and the other impurities present. When methyl ethyl ketone is used as a solvent, this temperature will lie within the range of below about 42° C., but above about 15° C., preferably above about 20° C. If desired, the cooling process may be carried out in stepwise fashion so as to result in the separation of separate quantities or "crops" of crystals of stearic acid of successively diminishing purity.

The relative amounts of solute, i. e. crude stearic acid, and solvent, i. e. the ketone solvent, should be relatively carefully controlled in order to obtain an effective separation of the pure stearic acid from the other fatty acids present in the mixture. When methyl ethyl ketone is used as a solvent, an optimum concentration range lies between about 15% and about 25% by weight of crude stearic acid and between about 85% by weight to about 75% by weight of methyl ethyl ketone, preferably about 20% of crude stearic acid and about 80% of methyl ethyl ketone. This insures separation of relatively pure stearic acid uncontaminated by the presence of other fatty acids.

The purified stearic acid may be separated from the mother liquor by any suitable means as by decantation, filtration, centrifuging, etc. If the stearic acid is to be used in the preparation of alpha-bromo stearic acid, it is usually desirable to substantially completely remove the ketone solvent from the precipitated stearic acid, since if the said solvent is not removed, it may itself be readily brominated by the reagents used to effect the bromination of the stearic acid, thus resulting in the formation of impure alpha-bromo stearic acid. The ketone solvent may be satisfactorily removed by heating the stearic acid, thereby volatilizing the solvent. This may be done, if desired, at subatmospheric pressure or in a current of air or of other inert gas. Another satisfactory method of removing the solvent comprises melting the freshly crystallized stearic acid and passing an inert gas, e. g. carbon dioxide, therethrough.

The efficiency of the process may be increased by recovering the ketone solvent from the mother liquor. This may be done by distilling it from the fatty acids contained therein, condensing the distillate and re-using it in the crystallization process. The crude mixture of fatty acids which remains after distillation of the solvent may, if desired, be subjected to subsequent recrystallizations in order to recover further quantities of stearic acid therefrom.

The process of the invention thus affords a practical and economical method for the commercial scale purification of crude stearic acid. It results in the separation of a very pure product, i. e. a product which may be more than 99% pure, which is suitable for use in the commercial production of high quality addition agents for lubricating oils. These results are, furthermore, obtained with high recoveries of the desired stearic acid and without excessive loss of solvent.

The process of the invention may be illustrated by the following examples.

*Example I*

A quantity of commercial stearic acid containing approximately 86% stearic acid, 4% oleic acid and 10% palmitic acid was dissolved in sufficient methyl ethyl ketone to form a solution containing approximately 20% by weight of crude stearic acid. The mixture was heated with stirring until solution of the crude stearic acid in the ketone solvent was complete. It was then cooled with stirring to a temperature of 20° C. and allowed to remain at that temperature as long as crystallization of the stearic acid occurred. The stearic acid which separated was placed in a centrifuge and centrifuged to remove the greater portion of the methyl ethyl ketone. The residual solvent was then removed by melting the acid and passing carbon dioxide therethrough. A 70% recovery of stearic acid having a purity of 96% was obtained.

The purified stearic acid was recrystallized, using the same procedure as outlined above. An 82% recovery of stearic acid having a freezing point of 69.2° C. and a purity of 99+% was obtained. The overall recovery of pure stearic acid from the two recrystallizations was about 60%.

*Example II*

A 20% solution of crude stearic acid in methyl isobutyl ketone was prepared at a temperature in excess of about 50° C. The solution was cooled to effect the separation of the purified stearic acid. That fraction separating in the temperature range of between about 40° C. and about 19° C. was separated from the mother liquor and dried. The yield of purified stearic acid (M. P. 68.9° C.) was 94%.

*Example III*

Crude stearic acid was purified by crystallization from mesityl oxide, using the procedure outlined in Example II with the exception that the temperature range employed was from about 38° C. to about 19° C. The yield of purified stearic acid (M. P. 68.8° C.) was again about 94%.

*Example IV*

Impure stearic acid was purified by cooling a 20% solution of the crude acid in isophorone and separating and drying that fraction which crystallized between about 38° C. and about 19° C. The product, which was obtained in a yield of about 85%, melted at about 68.9° C.

I claim as my invention:

1. A process for the production of substantially pure stearic acid from commercial mixtures of stearic acid and other fatty acids which comprises forming an approximately 20% solution of the impure stearic acid in substantially anhydrous methyl ethyl ketone containing less than about 1% water, cooling the said solution to a temperature of about 20° C. to effect the selective crystallization of pure stearic acid, centrifuging the mixture of crystallized stearic acid and mother liquor to separate the major portion of the mother liquor from the stearic acid crystals, melting the said stearic acid crystals, and passing a current of inert gas therethrough to effect the removal of any residual solvent therefrom.

2. A process for purifying crude stearic acid which comprises dissolving in substantially anhydrous methyl ethyl ketone containing less than about 1% water at a temperature of between about 50° C. and about 80° C. a sufficient amount of crude stearic acid to result in the formation of a solution containing between about 15% and about 25% of crude stearic acid, cooling the resulting solution to a temperature of about 20° C., and centrifuging the resulting mixture of crystallized stearic acid and mother liquor to separate the said stearic acid therefrom.

3. A process for separating stearic acid in a substantially pure state from a mixture comprising stearic acid together with substantial quantities of other fatty acids which comprises forming a 15% to 25% solution of the impure stearic acid in substantially anhydrous methyl ethyl ketone containing less than about 1% water at a temperature which is between about 42° C. and about 80° C., cooling while agitating the resulting solution to a temperature which is between about 15° C. and about 25° C. below the temperature of incipient crystallization of stearic acid, and separating the crystallized stearic acid.

4. A process for separating stearic acid in a substantially pure state from a mixture comprising stearic acid together with substantial quantities of other fatty acids which comprises forming a 15% to 25% solution of the impure stearic acid in substantially anhydrous methyl ethyl ketone containing less than about 1% water at a temperature which is between about 42° C. and about 80° C., cooling the resulting solution to a temperature of between about 15° C. and about 25° C., and separating the crystallized stearic acid.

5. A process for separating substantially pure stearic acid from crude stearic acid which contains other fatty acids as impurities, which comprises forming a solution containing from about 15% to about 25% by weight of crude stearic acid in a solvent comprising substantially anhydrous methyl ethyl ketone containing less than about 1% water at a temperature which is above 42° C. but below 80° C., cooling the resulting solution to a temperature of between about 15° C. and about 40° C., and separating the purified stearic acid.

6. A process for purifying crude stearic acid which comprises dissolving a sufficient amount of the said crude stearic acid in substantially anhydrous methyl isobutyl ketone containing less than about 1% water to form a solution containing from about 15% to about 25% by weight of the said crude stearic acid, cooling the said solution to a temperature which is from about 15° C. to about 25° C. below the temperature of incipient crystallization of stearic acid, and separating the purified stearic acid.

7. A process for separating stearic acid in a substantially pure state from a mixture comprising stearic acid together with substantial quantities of other fatty acids which comprises forming a 15% to 25% solution of impure stearic acid in substantially anhydrous mesityl oxide containing less than about 1% water at a temperature of above about 40° C., cooling the resulting solution, and separating the purified stearic acid which crystallizes over a temperature range of between about the temperature of incipient crystallization of stearic acid and a temperature which is from about 15° C. to about 25° C. below the said temperature of incipient crystallization.

8. A process for the purification of crude stearic acid which comprises forming at an elevated temperature an approximately 20% solution of the said crude stearic acid in a solvent comprising substantially anhydrous mesityl oxide containing less than about 1% water, cooling the said solution to effect the separation of the purified stearic acid, and separating from the mother liquor that portion which crystallizes over a temperature range of between about 38° C. and about 19° C.

9. A process for separating stearic acid from impurities comprising other fatty acids which comprises forming a 15% to 25% solution of the impure stearic acid in a substantially anhydrous ketone containing less than 1% water and having from 4 to 9 carbon atoms and being selected from the group consisting of the unsubstituted dialkyl ketones and the unsubstituted cycloalkyl ketones, at a temperature which is above the temperature of incipient crystallization of the said stearic acid in the ketone solvent but below the boiling temperature of the said ketone, cooling the resulting solution to a temperature which is from about 15° C. to about 25° C. below the temperature of incipient crystallization of stearic acid, and separating the purified stearic acid.

10. A method for the purification of stearic acid which comprises dissolving impure stearic acid in a ketone solvent comprising a substantially anhydrous ketone containing less than about 1% water and having from 4 to 9 carbon atoms and being selected from the group consisting of the unsubstituted dialkyl ketones and the unsubstituted cycloalkyl ketones, to form a 15% to 25% solution of the said crude stearic acid in said solvent at a temperature which is above the incipient crystallization temperature of the said stearic acid in the particular solvent used but below the boiling temperature of the said solvent, cooling the resulting solution to a temperature which is not more than about 25° C. below the temperature of incipient crystallization of stearic acid, and separating the purified stearic acid from the mother liquor.

DAVID E. ADELSON.

REFERENCES CITED

The following references are of record in the file of this patent:

UNITED STATES PATENTS

| Number | Name | Date |
| --- | --- | --- |
| 2,166,103 | Behr | July 18, 1939 |
| 2,291,461 | Freeman | July 28, 1942 |
| 2,298,501 | Myers | Oct. 13, 1942 |
| 2,340,104 | Brown | Jan. 25, 1944 |